2 Sheets—Sheet 1.

S. B. HART.
Grain Drill.

No. 9,604. Reissued March 15, 1881.

WITNESSES:

Jas. E. Hutchinson.

Albert H. Norris.

INVENTOR.

Stacy B. Hart, by James L. Norris.

Atty.

9,604. GRAIN-DRILL. STACY B. HART, Peoria, Ill. Filed Oct. 4, 1880. Original No. 221,408, dated Nov. 11, 1879.

S. B. HART.
Grain Drill.

No. 9,604. Reissued March 15, 1881.

WITNESSES:

Jas. E. Hutchinson.

Albert H. Norris.

INVENTOR.

Stacy B. Hart, by James L. Norris.

Atty.

UNITED STATES PATENT OFFICE.

STACY B. HART, OF PEORIA, ILLINOIS.

GRAIN-DRILL.

SPECIFICATION forming part of Reissued Letters Patent No. 9,604, dated March 15, 1881.

Original No. 221,408, dated November 11, 1879. Application for reissue filed October 4, 1880.

*To all whom it may concern:*

Be it known that I, STACY B. HART, a citizen of the United States, residing at Peoria, in the county of Peoria and State of Illinois, have invented certain Improvements in Grain-Drills, of which the following is a specification.

This invention relates to that class of seeding-machines which are provided with force-feed devices and with hoes that are under the control of the attendant.

My invention consists, first, in the combination of drag-bars having curved or bent ends with a straight rock-shaft having a series of crank-arms, with which the drag-bars are connected; second, in the combination of a rock-shaft having arms extended therefrom in opposite directions, with drag-bars having their ends curved and attached to arms, whereby the bars are adapted to reach around the shaft and maintain their parallelism under the different adjustments; third, in the combination of a wheeled frame, a series of vertically and independently swinging beams or drag-bars, and a rock-shaft mounted on said frame and provided with a series of rigid depending slotted arms arranged to directly embrace and engage beneath the respective beams or drag-bars; fourth, in the combination of a wheeled frame, a series of vertically and independently swinging drag-bars, and a rock-shaft mounted on said frame and having a series of rigid depending slotted arms, provided at the lower ends of their slots with rolling bearings which rest beneath the respective drag-bars; fifth, in a feed-wheel consisting of two sections or parts, one of which is stationary and provided with longitudinal and radial side grooves or recesses, and the other section capable of sliding over and upon the longitudinally-grooved portion of the stationary section, and having its inner face provided with grooves or recesses, forming an adjustable cut-off; sixth, in a feed-wheel in which is combined a stationary section or part through which the axle passes, and provided with longitudinal and radial side grooves or recesses forming a continuation of each other, and a sliding section or cut-off having grooves or recesses on its inner face and constructed to be adjusted over and upon the longitudinally-grooved portion of the stationary section.

Figure 1:
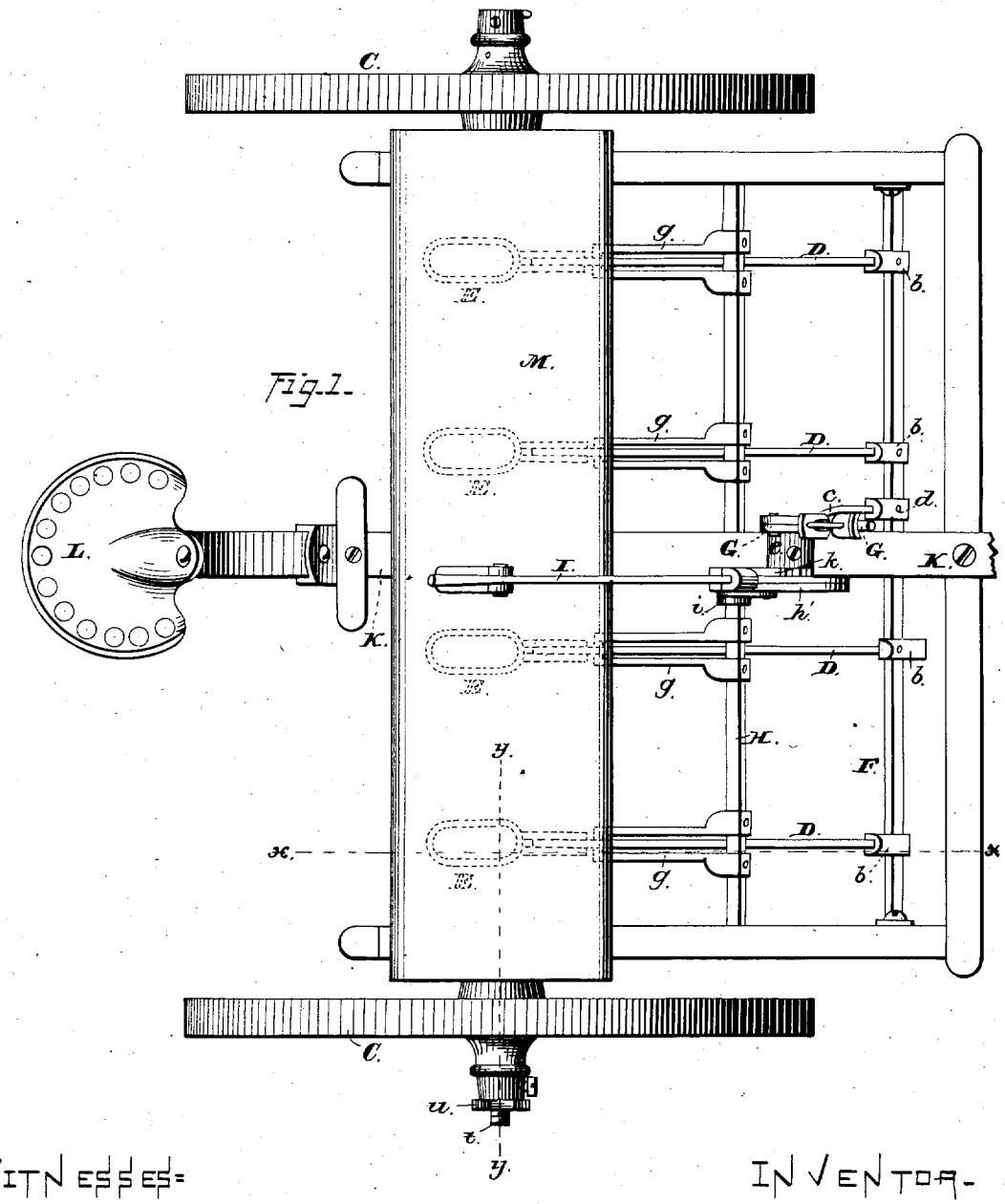
Figure 2:
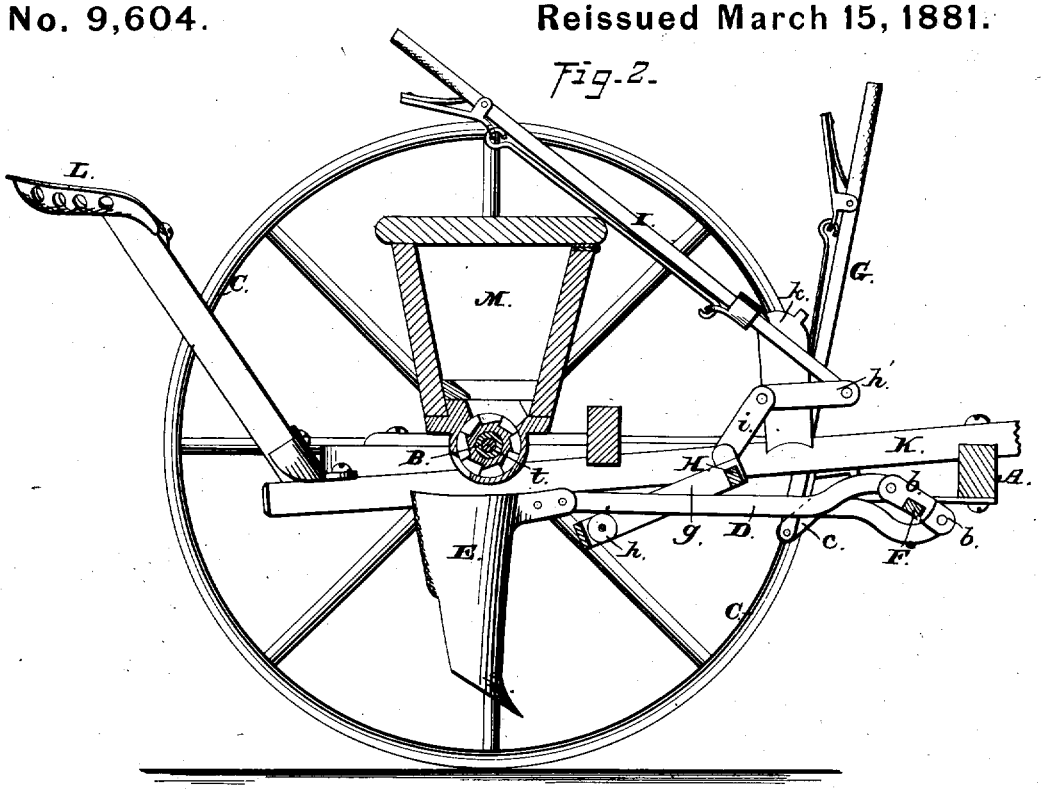
Figure 3:
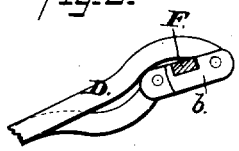
Figure 4:
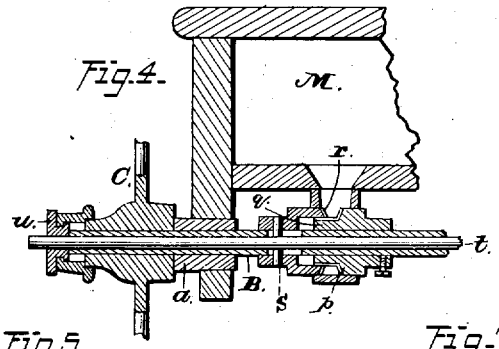
Figure 6:
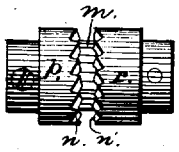
Figure 5:
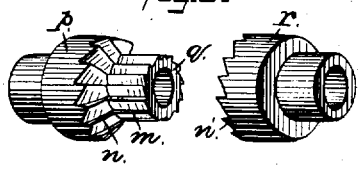
Figure 7:
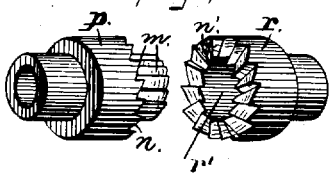

Figure 1 represents a top-plan view of my machine; Fig. 2, a longitudinal vertical section of the same; Fig. 3, a view showing the curvature and connection of the drag-bars; Fig. 4, a transverse vertical section of the machine on the line *y y*; Fig. 5, a perspective view of one of the feed-rolls; Fig. 6, a side elevation of the same; and Fig. 7 is a perspective view of the feed-wheel, to show the interior of the adjustable portion.

In its general construction and mode of operation the machine embraces a structure which is similar to those now in general use—that is, a wheel-frame provided with a series of drag-bars or beams having hoes attached, and with a transverse grain-hopper and rotary devices thereunder to deliver the grain in a continuous stream into the hoes.

A represents the rigid main frame, of ordinary form and structure, bolted to the under side of two metal boxes or bearings, *a*, which are mounted loosely upon a transverse tubular shaft, B, the ends of which are sustained in two wheels, C, which latter will be connected, either or both, with the shaft by means of suitable clutches.

D represents the drag-bars or beams, provided at their rear ends with the usual hoes or drill-teeth, E, and pivoted at their forward ends to arms *b* on a transverse rock-shaft, F, extending across the front of the frame, as shown.

It will be noticed that the arms extend alternately from opposite sides of the shaft, so that when it is turned every alternate bar will be moved backward and the others moved forward. It will be noticed, further, that the bars or beams are made in two lengths, alternately long and short, and so arranged that when the rock-shaft is turned forward the hoes stand in a broken or zigzag line, but that when it is turned backward they stand in a single straight line or rank. The front ends of the bars or beams are curved or bent, it will be seen, one upward and the next downward, throughout the series, this construction being adopted in order that the shaft may make a half-revolution, or nearly so, so that the bars may stand parallel and the hoes stand at one inclination under each adjustment. In practice it is highly important that this uniformity in the position of the hoes shall be maintained, in order that they shall enter the ground alike; and by curving the beams, as shown, I am able to secure this end without cutting, cranking, or bending the rock-shaft, as would otherwise be required. The straight unbroken shaft is advantageous, in that it is cheaper, lighter, and stronger than a shaft having cranks or bends therein.

Any suitable means may be employed for turning the shaft F; but it is preferred to employ a hand-lever, G, mounted on the tongue or frame in advance of the hopper, and connected by a link, *c*, with an arm, *d*, on the shaft, the lever being provided with a latch or locking device which engages in a rack-plate, *e*, to hold the lever and bars from shifting accidentally.

As a means of elevating the drag-bars and hoes, and also of bracing them against lateral movement, there is mounted across the main frame in advance of the hopper or grain-box a second rock-shaft, H, having a series of depending vertically-slotted arms, *g*, each provided in the lower end with a roller, *h*, and each having one of the drag-bars passed through it above the roller, as clearly represented in Figs 1 and 2. When the arms *g* are turned downward they serve to prevent the bars from springing laterally, but leave them free to rise and fall with perfect freedom; but when the arms are elevated by turning the shaft H forward the rollers, acting against the under side of the bars, raise them and lift the hoes from the ground.

The shaft H may be controlled and operated by any suitable means—such, for example, as the hand-lever I, mounted on the frame and connected by a link, *h'*, with an arm, *i*, on the shaft.

As a means of holding the bars in an elevated position, the hand-lever may be provided with latching devices to engage with a fixed rack, *k*, or other devices employed, in connection with the lever or the shaft, for the same purpose.

In the construction of the machine the two rock-shafts will be made usually of a square or angular form, and the arms made of malleable iron with eyes in one end to fit the shaft, so that they may be slipped thereon from the end.

In order that the levers may be controlled by the attendant while riding upon the machine, the tongue or draft-pole K, located, as usual, at the center of the machine, is extended backward beneath the hopper to a point in rear of the same, and provided with a standard sustaining the driver's seat L, as shown in Figs. 1 and 2. The seat and the levers are arranged with special reference to each other, so that the driver, while in the seat, may readily reach and operate the levers. This arrangement puts the hoes fully under the control of the driver without destroying the proper draft and balance of the machine, and avoids the loss of time and labor incident to the use of the ordinary machines, which require the attendant to dismount when the hoes are to be shifted, the machine turned, or the hoes lifted.

The hopper or grain-box M extends, as usual, across the machine, and is secured to the main frame or the boxes *a* directly over the axle, which in this machine serves also as a feed-shaft.

The feeding devices are of that class in which the grain is delivered through a cup or case in a continuous stream by means of a horizontal roller having a circumferential groove or channel to carry the grain and determine the rate of delivery, and to that particular style of device in which the feed wheel or disk is made in two sections, so that the width of the channel may be varied to increase or diminish the rate of delivery. The improvements consist in providing longitudinal grooves in the bottom as well as vertical grooves in the sides of the channel, in the special form of the teeth, and in the means for adjusting the wheel.

The feed-wheel is clearly illustrated in Figs. 5 and 6, and it is composed in part of a stationary section, *p*, formed with a reduced hub-like portion, *q*, the inner face portion of the section *p* being provided with a series of radial grooves or recesses, *n*, and the hub-like portion having a series of longitudinal grooves or recesses, *m*, each of the latter forming a continuation of one of the radial grooves *n*. The other portion of the feed-wheel is composed of a sliding section, *r*, having its inner vertical face portion provided with a series of grooves or recesses, *n'*, and said section is formed or provided with an internal annular chamber, *r'*, which is adapted to slide over and upon the longitudinally-grooved hub-like portion *q* of the section *p*, thus forming an adjustable cut-off. In Figs. 5, 6, and 7 the grooves or recesses *n*, *m*, and *n'* are shown as made at an acute angle—that is, substantially in the form of ordinary ratchet-teeth having upright front faces and inclined rearward; but on the face portions of the sections the grooves are made of increasing depth as they approach the periphery or outside edges of said sections. This form of the teeth insures a steady and uniform delivery of the grain, the inclination of the side grooves being particularly advantageous, in that it secures the ready escape and delivery when the space between the two sections *p* and *r* is narrow and when oats or other light grain is being distributed. By sliding the section or cut-off over and upon the hub-like portion *q* of the stationary section *p* the intermediate space is adjusted in size and the feed of grain is regulated without changing the speed of rotation.

In the operation of the feed-wheel there is a joint coaction between the longitudinal grooves *m* and the side grooves, *n n'*, which greatly increases the force of the feed and distributes the grain in a most effective, uniform, and regular manner. The ends of both parts of the feed-wheel are contracted so as to fit snugly upon the driving-shaft and part *p* screwed or pinned fast thereon, while part *r* is arranged to slide endwise, and connected by pins *s* passing through slots in the shaft with a rod, *t*, which extends centrally through the shaft and outward beyond the end of the same, as shown in Fig. 4, so that by moving the rod endwise all the rolls in the machine may be varied in capacity equally and simultaneously.

As a means of adjusting the rod *t*, its end is threaded and passed through a nut, *u*, secured to the outer end of the hub of one of the main wheels in such manner that it can rotate freely but not move laterally.

Heretofore a series of loose pendent links have been used to elevate the drag-bars in a seeding-machine, and such is not broadly claimed.

Having thus described my invention, what I claim is—

1. The combination of the drag-bars having curved or bent ends with the straight rock-shaft having the series of crank-arms, as described and shown.

2. The combination of a rock-shaft having arms extended therefrom in opposite directions with drag-bars having their ends curved and attached to the arms, substantially as described, whereby the bars are adapted to reach around the shaft and maintain their parallelism under the different adjustments.

3. The combination of a wheeled frame, a series of vertically and independently swinging beams or drag-bars, and a rock-shaft mounted on said frame and provided with a series of rigid depending slotted arms arranged to directly embrace and engage beneath the respective beams, as shown and described.

4. The combination of a wheeled frame, a series of vertically and independently swinging drag-bars, and a rock-shaft mounted on said frame and having a series of rigid depending slotted arms, provided at the lower ends of their slots with rolling bearings, which rest beneath the drag-bars, substantially as described.

5. In a force-feeding wheel for seeding-machines, the combination, substantially as hereinbefore described, of a horizontal grooved feed and two vertical grooved feeds arranged to face each other, and one constructed to slide over and upon the other for adjusting the intervening channel, the whole constituting a combined horizontal and duplex vertical feed, as set forth.

6. In a force-feed seeding-machine, a stationary section or part through which the axle passes, and provided with longitudinal and radial side grooves or recesses, forming a continuation of each other, and a sliding section or cut-off having grooves or recesses on its inner face portion and constructed to be adjusted over and upon the longitudinally-grooved portion of the stationary section, substantially as described.

7. The feed-wheel having a circumferential channel, provided in the bottom and on both sides with teeth having abrupt front edges and inclined rear edges, as shown.

In testimony whereof I have hereunto set my hand in the presence of the subscribing witnesses.

STACY B. HART.

Witnesses:
ALBERT H. NORRIS,
JAMES A. RUTHERFORD.